(12) United States Patent
Bess

(10) Patent No.: US 7,853,489 B2
(45) Date of Patent: Dec. 14, 2010

(54) SYSTEM AND METHOD FOR AGENT BASED DEVELOPER SELF SELECTION

(75) Inventor: Charles E. Bess, McKinney, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1422 days.

(21) Appl. No.: 11/285,320

(22) Filed: Nov. 22, 2005

(65) Prior Publication Data
US 2007/0118433 A1 May 24, 2007

(51) Int. Cl.
G06F 17/30 (2006.01)
(52) U.S. Cl. .......................... 705/27; 705/26
(58) Field of Classification Search .................. 705/26, 705/27
See application file for complete search history.

(56) References Cited

U.S. PATENT DOCUMENTS

| | | | |
|---|---|---|---|
| 5,592,375 A * | 1/1997 | Salmon et al. ................. | 705/7 |
| 6,647,373 B1 * | 11/2003 | Carlton-Foss ................ | 705/37 |
| 7,072,857 B1 * | 7/2006 | Calonge ...................... | 705/26 |
| 2001/0051889 A1 * | 12/2001 | Haney .......................... | 705/8 |
| 2001/0051913 A1 * | 12/2001 | Vashistha et al. ............. | 705/37 |
| 2002/0147708 A1 | 10/2002 | Thomas et al. | |
| 2003/0061089 A1 * | 3/2003 | Weaver ........................ | 705/9 |
| 2004/0107125 A1 | 6/2004 | Guheen et al. | |
| 2004/0210470 A1 | 10/2004 | Rusk | |
| 2004/0225550 A1 * | 11/2004 | Helander et al. ............... | 705/9 |
| 2005/0080657 A1 * | 4/2005 | Crow et al. .................... | 705/8 |

OTHER PUBLICATIONS

Business Wire, "mondus.com Chooses IRT for Customer Relationship Management; Leading e-Marketplace for Office Equipment and Services Expands Customer Contact Campaign", dated Aug. 28, 2000.*

PRNewswire, "Bidcom Announces Bidding Functionality for the Building Industry", dated May 8, 2000.*

* cited by examiner

Primary Examiner—Mark Fadok (57) ABSTRACT

A method, system, and computer program product for matching developers or entities with certain skills with work projects is provided. In one embodiment, a project manager utilizes a bid management agent which receives project specifications from the project manager specifying such things as, for example, project duration, work product desired, skill sets desired by the developers, experience level desired of the developers, and compensation. The bid management agent broadcasts a request for quotes for the project to utilization management agents. Each utilization management agent is employed by a different developer or entity and receives and tracks the interests and skills and other attributes of the developer and sends a quote to a bid management agent when it receives a request for a quote for a project which matches the interests, skills, availability, and other attributes of the developer for which the utilization management agent is employed. The bid management agent sends contracts to utilization management agents from which it receives quotes it deems acceptable based on project manager specified criteria.

30 Claims, 6 Drawing Sheets

400
Network
Figure 4

SYSTEM AND METHOD FOR AGENT BASED DEVELOPER SELF SELECTION

BACKGROUND OF THE INVENTION

1. Technical Field

The present invention relates to computer software and, more specifically, to software agents and systems for matching individuals with specified skill sets with appropriate tasks.

2. Description of Related Art

Identifying personal to work on projects across a geographically diverse organization and collection of companies is difficult. Currently most organizations use a relatively manual process, supported by communications between supervisors and project leaders, for assigning individuals to projects and tasks. Skills and availability are agreed upon using this time consuming interaction. Availability may be tracked via calendaring software like Microsoft® Office Outlook®. (Microsoft® Office Outlook® is a product and registered trademark of Microsoft Corporation of Redmond, Wash.). A separate skills database may also be kept using a resource management tool like SAP. Tools, such as, for example, Evolve, are available that look at an individual's calendar against the individual's set of skills. However, the interests of the individual are not incorporated. Therefore someone who is interested in a particular topic may be overlooked based upon other attributes. Furthermore this process is time consuming and error prone and also may result in assigning an individual work that the person is not interested in. Uninteresting work can result in quicker worker fatigue and poor performance as well as lead to low workplace moral.

To alleviate the time consuming task of appropriately assigning tasks to individuals in an environment containing a large number of individuals who are perhaps geographically disperse as well as improve the match between assignments and individuals, it would be desirable to have an automated system that provides software agents on behalf of the individuals and employers to aid in matching individuals to projects. Such a system may offer the benefits of reducing the time and effort associated with matching an individual with an assignment. Such a system may also provide a mechanism that more appropriately matches individuals with projects they are suited for and interested in.

SUMMARY OF THE INVENTION

The present invention provides a method, system, and computer program product for matching developers or entities with certain skills with work projects. In one embodiment, a project manager utilizes a bid management agent which receives project specifications from the project manager specifying such things as, for example, project duration, work product desired, skill sets desired by the developers, experience level desired of the developers, and compensation. The bid management agent broadcasts a request for quotes for the project to utilization management agents. Each utilization management agent is employed by a different developer or entity and receives and tracks the interests and skills and other attributes of the developer and sends a quote to a bid management agent when it receives a request for a quote for a project which matches the interests, skills, availability, and other attributes of the developer for which the utilization management agent is employed. The bid management agent sends contracts to utilization management agents from which it receives quotes it deems acceptable based on project manager specified criteria.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
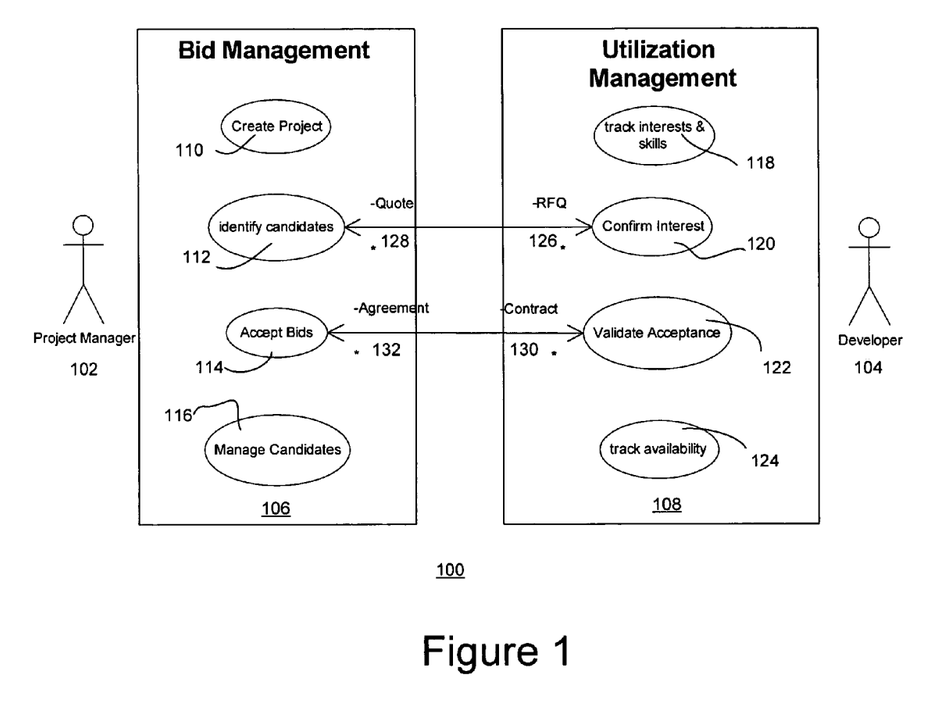
FIG. 1 depicts a schematic diagram illustrating process flows and program functions for an exemplary agent based developer self selection system in accordance with one embodiment of the present invention.

With reference now to the figures, and in particular with reference to FIG. 1, a schematic diagram illustrating process flows and program functions for an exemplary agent based developer self selection system is depicted in accordance with one embodiment of the present invention.

The agent based self selection system 100 in the embodiment depicted in FIG. 1 comprises a bid management agent 106 working on behalf of a project manager 102 and a utilization management agent 108 working on behalf of a developer 104. For simplicity and ease of illustration a single bid management agent 106 and a single utilization management agent 108 are depicted. However, in most implementations, the system 100 will include multiple bid management agents and multiple utilization management agents wherein each project manager would typically have at least one bid management agent at their disposal and each developer would have a utilization management agent.

The bid management agent 106 comprises a user interface, preferably a graphical user interface, (however, the particular user interface type is not critical) which enables the project manager 102 to create a project 110 and specify the candidate selection criteria which should be included by the bid management agent 106 in the broadcast of the project. For example, the criteria could include, for example, experience level, a skill set, a location, specify a compensation level or structure, and a time requirement by which the project should be completed. The bid management agent 106 then broadcasts the project (which includes the specified criteria) and a Request For Quote (RFQ) 126 to utilization management agents 108. Methods of broadcasting information over a network are well known to those skilled in the art and will not be discussed herein. The candidate selection criteria may also include criteria by which the bid management agent 106 may select from multiple quotes 128 should several developer's 104 utilization management agents 108 in excess of the number of developers needed for the project reply to the broadcast RFQ 126

Further description of the bid management agent 106 function is described below. However, we turn now to the utilization management agent 108. The utilization management agent 108 serves the needs of a developer 104 in obtaining and scheduling projects of greatest interest to the developer 104. The utilization management agent 108 includes a user interface, such as, for example, a graphical user interface, that allows the developer 104 to specify the developer's 104 interests and skills thereby allowing the utilization management agent 108 to track the developer's 104 interests and skills 118. For example, the developer 104 could specify education background, skill sets, experience, as well as provide a hierarchy of preferences as to what types of projects the developer 104 prefers. The developer 104 may also specify the type and amount of compensation desired for performing each type of project or skill.

The developer 104 may also specify criteria by which the utilization management agent 108 may select from among competing projects. For example, the developer may prefer one type of project if all time and compensation are equal among competing projects. However, the developer may be willing to accept an otherwise less desirable project if the compensation of the less desirable project exceeds that of competing projects and/or exceeds a threshold level of compensation. Similar criteria may be specified for other variables such as, for example, time requirements and/or travel requirements. Other variables may also be used to help differentiate between competing projects as will be recognized by those skilled in the art. Therefore, the particular variables specified herein should not be taken as a limitation of the present invention, but rather merely as examples.

Thus, once the utilization management agent 108 receives the RFQ 126 that has been broadcast by the bid management agent 106, the utilization management agent 108 confirms 120 whether the developer has an interest by comparing the project requirements to the interests, skills, and other specification criteria set up by the developer 104 to determine, first, whether the developer has the qualifications and availability specified by the project manager and, second, whether the developer 104 has an interest in the project. If an interest is confirmed 120, the utilization management agent 108 sends a quote 128 to the bid management agent 106. The quote may specify a desired compensation, a time frame in which the work will be performed, or other information that the developer 104 wishes. For example, if the RFQ 126 for the project merely contained a range of values for some variables, such as, for example, compensation or time frame, the Quote 128 may supply the developer's desired terms. In another scenario, the RFQ may have omitted some variables, such as, compensation. In such case, again, the Quote 128 then supplies the omitted criteria based upon factors specified by the developer 104.

The bid management agent 106 then receives quotes 128 from one or more utilization management agents 108 and utilizes candidate selection criteria specified by the project manager 102 to identify candidates 112. The bid management agent then accepts bids 114 and sends a contract 130 to the utilization management agent(s) 108 corresponding to the accepted bid(s).

The utilization management agent 108 then validates acceptance 122 of the contract 130 ensuring that the contracts 130 terms reflect the terms that are acceptable to the developer 104 and sends an indication of agreement 132 back to the bid management agent confirming the agreement. As part of this acceptance validation 122 process, the utilization management agent 108 may notify the developer 104 and allow the developer 104 to validate or veto the contract 130 to further ensure that the developer 104 approves of the contract. The utilization management agent 108 then notifies the developer 104 by, for example, e-mail, instant messaging, or some other appropriate method of the project contract with the specified terms and perhaps other information such as, for example, the contact information for the project manager and identities and contact information for other team members on the project. The utilization management agent 108 updates a data storage that tracks the availability 124 of the developer to indicate that the times specified in the project contract or unavailable for accepting other projects.

The bid management agent 106 then manages candidates 116 supplying them with information relevant to the performance of their tasks for the project.

Thus, this approach is based upon being able to predefine the developer entities attributes such as, for example:
 area of interest (a willingness to perform the work based upon salary level);
 skill set; and
 availability;

and have a software program acting as an agent to automatically respond to requests for those skills and capabilities. This entity may be a single developer, a whole company of developers or even an intermediary that can subcontract developers.

As stated above, project managers can define attributes of the project such as, for example:
 duration;
 skills required;
 expectations of the developer like a certain level of quality and experience.

Thus, the bid management agent 106, in one embodiment, performs the following functions:
 1) Definition of the project;
 2) Definition of the candidate list;
 3) Broadcast of the work that needs to be done; and
 4) Coordination of the contracting process.

The utilization management agent 108, in one embodiment, performs the following:
 1) Tracks attributes of the developer, such as, for example, interest and skills;
 2) Tracks the availability of the developer;
 3) Responds to RFQs from the bid manager with availability and compensation level without necessarily interacting with the developer; and
 4) Responds to contract requests from the bid manager by interacting with the developer to ensure a contract.

Figure 2:
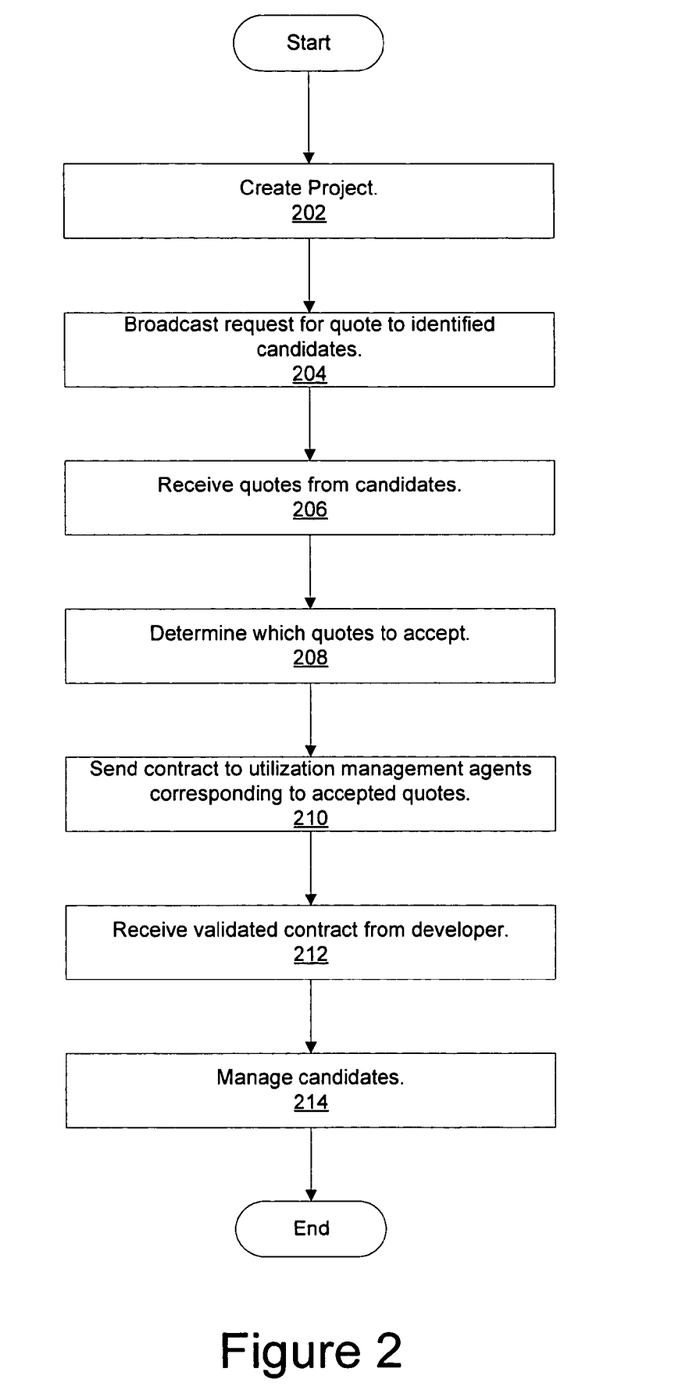
FIG. 2 depicts an exemplary process flow and program function for an exemplary bid management agent in accordance with one embodiment of the present invention.

With reference now to FIG. 2, an exemplary process flow and program function for an exemplary bid management agent is depicted in accordance with one embodiment of the present invention.

To begin, a bid management agent, such as, for example, bid management agent 106 illustrated in FIG. 1, creates a project based upon criteria specified by a project manager 202 and broadcasts a request for quotes for the project to utilization management agents within a network (step 204). The bid management agent then receives quotes from utilization management agents representing various developers (step 206). If quotes are received from more developers than are required for the project, then the bid management agent determines which of the received quotes to accept based on selection criteria specified by the project manager (step 208). The bid management agent then sends a contract to the one or more utilization management agents corresponding to accepted quotes for validation by the utilization management agent and/or corresponding developer (step 210). The bid management agent then receives the validated contract from the utilization management agents 212 and manages the candidates (step 214).

If a contract for an accepted quote is ultimately rejected by the corresponding developer, then the bid management agent may then accept the next best quote or if there are no other quotes to accept, may rebroadcast the project to start the process over. The rebroadcast project may, in some embodiments have the project criteria broadened so as not to exclude as many potential candidates.

Figure 3:
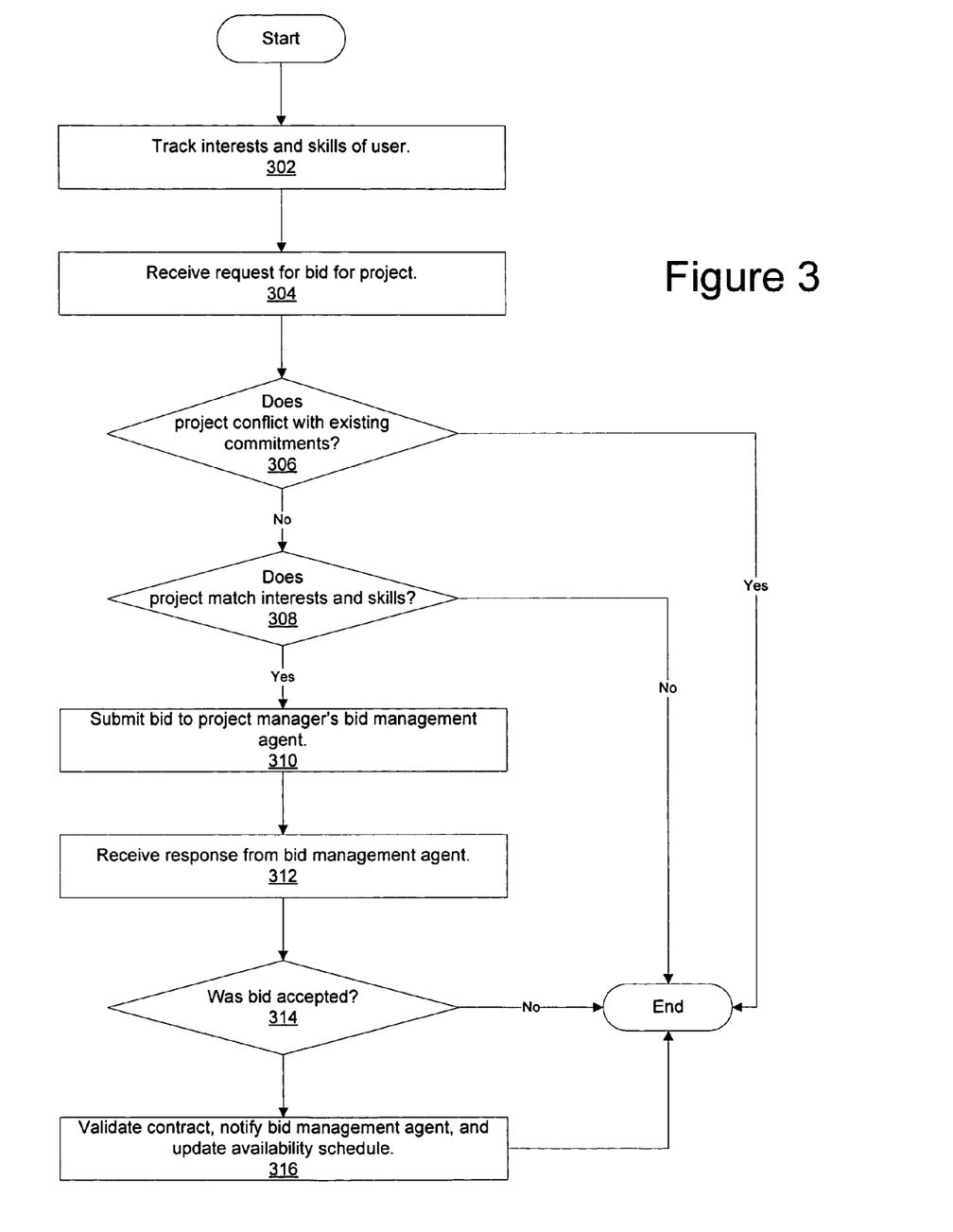
FIG. 3 depicts an exemplary process flow and program function for an exemplary utilization management agent in accordance with one embodiment of the present invention.

With reference now to FIG. 3, an exemplary process flow and program function for an exemplary utilization management agent is depicted in accordance with one embodiment of the present invention.

The utilization management agent, such as, for example, utilization management agent 108 illustrated in FIG. 1, tacks the interests and skills of a user or developer (step 302) by, for example, receiving input from the developer specifying the developer's preferences, skills, experience level, and/or other relevant information, such as schedule and current availability. The utilization management agent then monitors a network for broadcasts from bid management agents. The utilization management agent then may receive a request for quote for a project (step 304) and determines whether the project conflicts with existing commitments (step 306). If the project conflicts with existing commitments and an alternative cannot be resolved, the agent ignores the request for quote and no further action is taken.

If the project does not conflict with existing commitments of the developer, then the utilization management agent determines whether the project matches the interests and skills of the developer (step 308). If the project does not match the interests and skills of the developer as defined by the developer, then the request for quote is ignored and no further action is taken related to the request for quote. If, however, the project does match the interests and skills of the developer, then a quote or bid is prepared based on developer criteria and submitted to the project manager's bid management agent (step 310).

The utilization management agent then awaits a response from the bid management agent. Once a response is received from the bid management agent (step 312), the utility management agent determines from the response whether the bid was accepted (step 314). If the bid was not accepted, then no further action is taken by the utility management agent. If, however, the bid was accepted and a contract has been received from the bid management agent, the utility management agent validates the contract with the developer and, if validated, notifies the bid management agent and updates the developer's availability schedule to show the appropriate times as busy (step 316).

Figure 4:
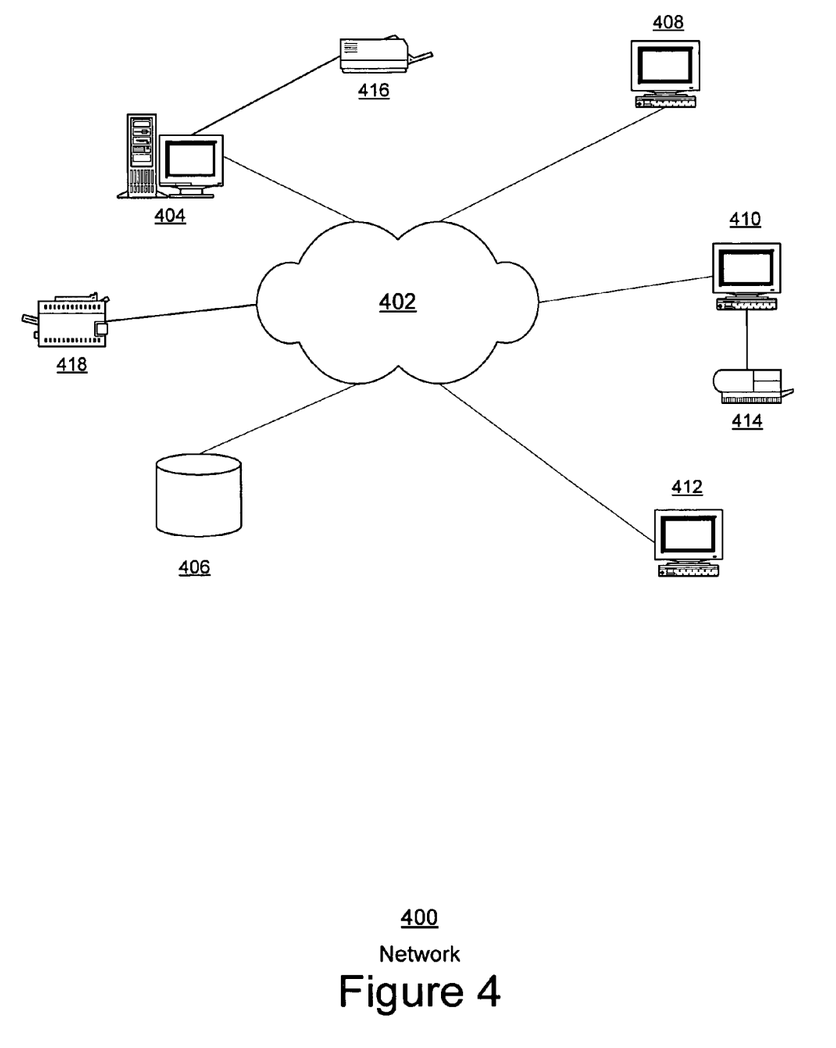
FIG. 4 depicts a pictorial representation of a distributed data processing system in which the present invention may be implemented.

With reference now to FIG. 4, a pictorial representation of a distributed data processing system is depicted in which the present invention may be implemented.

Distributed data processing system 400 is a network of computers in which the present invention may be implemented. Distributed data processing system 400 contains network 402, which is the medium used to provide communications links between various devices and computers connected within distributed data processing system 400. Network 402 may include permanent connections, such as wire or fiber optic cables, or temporary connections made through telephone connections.

In the depicted example, server 404 is connected to network 402, along with storage unit 406. In addition, clients 408, 410 and 412 are also connected to network 402. These clients, 408, 410 and 412, may be, for example, personal computers, network computers, personal digital assistants (PDAs), or other network enabled data processing device. For purposes of this application, a network computer is any computer coupled to a network that receives a program or other application from another computer coupled to the network. In the depicted example, server 404 may provide data, such as boot files, operating system images and applications, to clients 408-412. However, more importantly, server 404 provides a data processing system on which bid management agents and utility management agents may be implemented. In many embodiments, network 400 may include several servers in addition to server 404 and some agents may be implemented on different servers within the network 400. Clients 408, 410 and 412 include functionality enabling a developer or project manager to interface with its utility management agent or bid management agent.

Alternatively, the bid management agents and utilization management agents, such as agents 106 and 108 depicted in FIG. 1, may be implemented on a client, such as any one of clients 408, 410, and 412.

Distributed data processing system 400 may include additional servers, clients, and other devices not shown. In order for developers and project managers to print out information relevant to, for example, projects and accepted bids, distributed data processing system 400 also includes printers 414, 416 and 418. A client, such as client 410, may print directly to printer 414. Clients such as client 408 and client 412 do not have directly attached printers. These clients may print to printer 416, which is attached to server 404, or to printer 418, which is a network printer that does not require connection to a computer for printing documents. Client 410, alternatively, may print to printer 416 or printer 418, depending on the printer type and the document requirements.

In the depicted example, distributed data processing system 400 is the Internet, with network 402 representing a worldwide collection of networks and gateways that use the TCP/IP suite of protocols to communicate with one another and appropriate security tools, such as, for example, encryption, Virtual Private Networks (VPNs), and other devices utilized to ensure confidentiality of the information sent over the network. At the heart of the Internet is a backbone of high-speed data communication lines between major nodes or host computers consisting of thousands of commercial, government, education, and other computer systems that route data and messages. Of course, distributed data processing system 400 also may be implemented as a number of different types of networks such as, for example, an intranet or a local area network.

FIG. 4 is intended as an example and not as an architectural limitation for the processes of the present invention.

Figure 5:
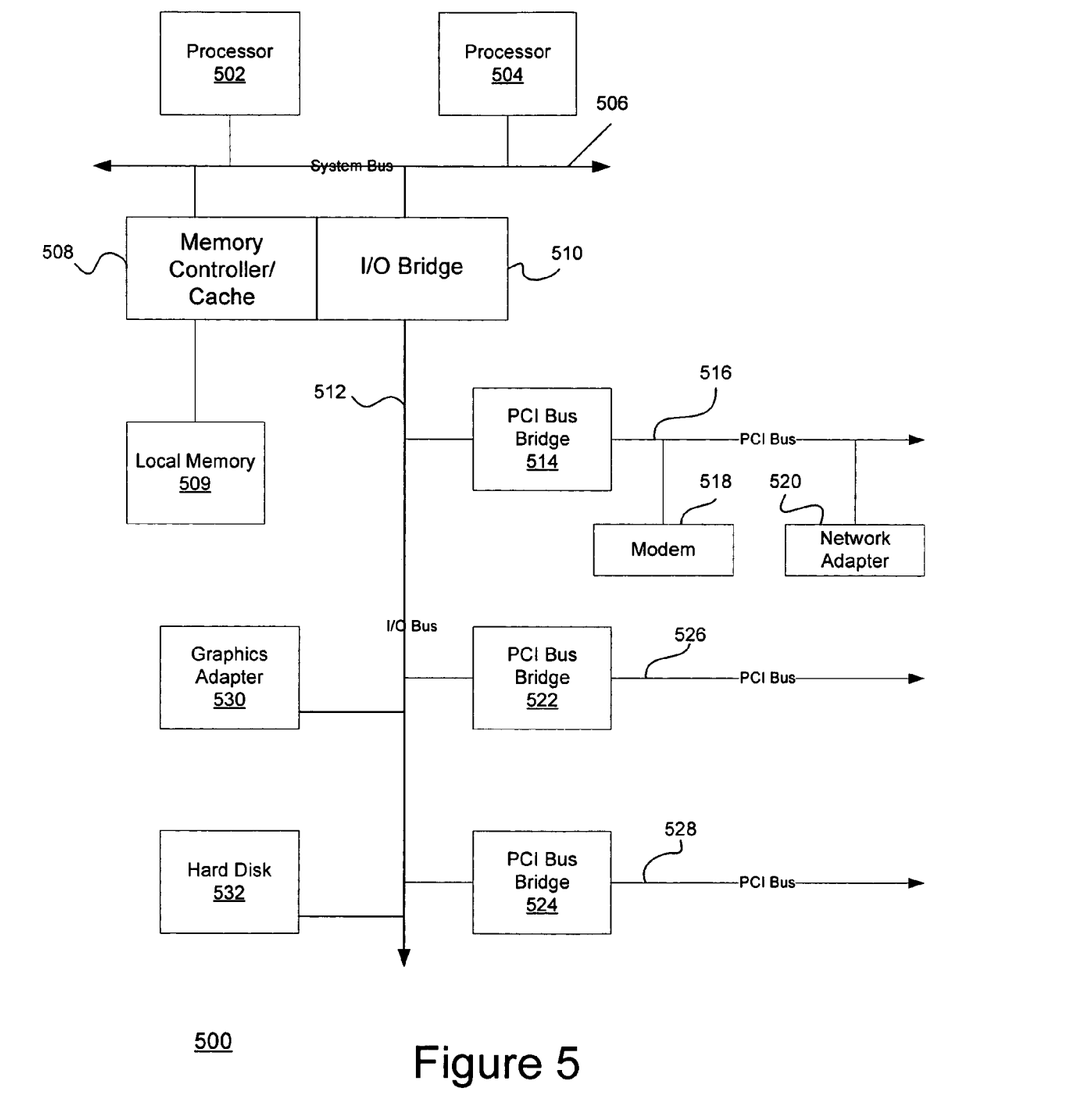
FIG. 5 depicts a block diagram of a data processing system which may be implemented as a server in accordance with the present invention.

Referring to FIG. 5, a block diagram of a data processing system which may be implemented as a server, such as server 404 in FIG. 4, is depicted in accordance with the present invention. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems 518-220 may be connected to PCI bus 516. Typical PCI bus implementations will support four PCI expansion slots or add-in connectors. Communications links to network computers 408-412 in FIG. 4 may be provided through modem 518 and network adapter 520 connected to PCI local bus 516 through add-in boards.

Additional PCI bus bridges 522 and 524 provide interfaces for additional PCI buses 526 and 528, from which additional modems or network adapters may be supported. In this manner, server 500 allows connections to multiple network computers. A memory mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

Data processing system 500 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries.

Figure 6:
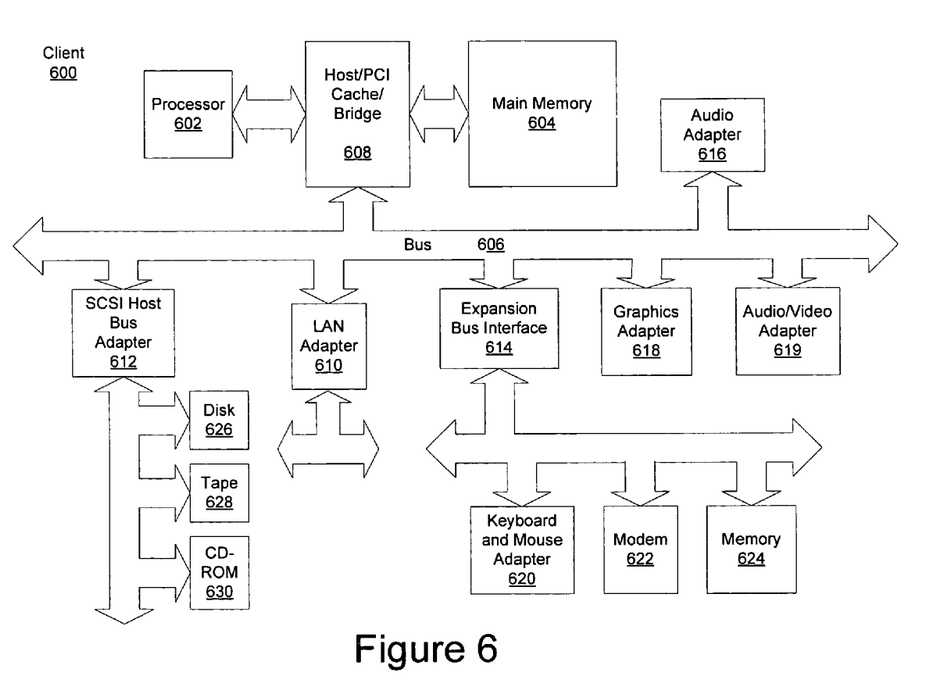
FIG. 6 depicts a block diagram of a data processing system in which the present invention may be implemented.

With reference now to FIG. 6, a block diagram of a data processing system in which the present invention may be implemented is illustrated. Data processing system 600 is an example of a client computer. Data processing system 600 employs a peripheral component interconnect (PCI) local bus architecture. Although the depicted example employs a PCI bus, other bus architectures, such as Micro Channel and ISA, may be used. Processor 602 and main memory 604 are connected to PCI local bus 606 through PCI bridge 608. PCI bridge 608 may also include an integrated memory controller and cache memory for processor 602. Additional connections to PCI local bus 606 may be made through direct component interconnection or through add-in boards. In the depicted example, local area network (LAN) adapter 610, SCSI host bus adapter 612, and expansion bus interface 614 are connected to PCI local bus 606 by direct component connection. In contrast, audio adapter 616, graphics adapter 618, and audio/video adapter (A/V) 619 are connected to PCI local bus 606 by add-in boards inserted into expansion slots. Expansion bus interface 614 provides a connection for a keyboard and mouse adapter 620, modem 622, and additional memory 624. In the depicted example, SCSI host bus adapter 612 provides a connection for hard disk drive 626, tape drive 628, CD-ROM drive 630, and digital video disc read only memory drive (DVD-ROM) 632. Typical PCI local bus implementations will support three or four PCI expansion slots or add-in connectors.

An operating system runs on processor 602 and is used to coordinate and provide control of various components within data processing system 600 in FIG. 6. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 600. Instructions for the operating system, the object-oriented operating system, and applications or programs are located on a storage device, such as hard disk drive 626, and may be loaded into main memory 604 for execution by processor 602.

Those of ordinary skill in the art will appreciate that the hardware in FIG. 6 may vary depending on the implementation. For example, other peripheral devices, such as optical disk drives and the like, may be used in addition to or in place of the hardware depicted in FIG. 6. The depicted example is not meant to imply architectural limitations with respect to the present invention. For example, the processes of the present invention may be applied to multiprocessor data processing systems.

Although described primarily with reference to matching developers such as software developers with projects, the present invention is not limited to such use. For example, the present invention may be applied to any type of project in which persons or entities with special skills are needed to staff a project including such projects as, for example, accounting, engineering, and legal projects. Therefore, the term developer as used herein, should not be construed to refer only to software developers or to individuals, but includes any type of person or entity (where an entity may contain a plurality of persons) with a special skill or skills.

To aid the Patent Office, and any readers of any patent issued on this application in interpreting the claims appended hereto, it is noted that applicant does not intend any of the appended claims to invoke paragraph 6 of 35 U.S.C. §112 as it exists on the date of filing unless the words "means for" are used in the particular claim. Furthermore, none of the description in the present application should be read as implying that any particular element, step, or function is an essential element which must be included in the claim scope: THE SCOPE OF THE PATENTED SUBJECT MATTER IS DEFINED ONLY BY THE ALLOWED CLAIMS. Thus, the extent of legal protection will be determined by the limitations recited in the allowed claims and their equivalents. Unless explicitly recited, other aspects of the present invention as described in this specification do not limit the scope of the claims.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of matching skill possessors with projects, the method comprising:
    receiving, at one or more computers comprising a bid management agent, project specifications;
    broadcasting, by the one or more computers comprising the bid management agent, at least some of the project specifications over a network;
    receiving, at one or more computers comprising a utilization management agent, the at least some of the project specifications;
    sending, by the one or more computers comprising the utilization management agent, a quote to the one or more computers comprising the bid management agent if the at least some of the project specifications match criteria specified by a developer on whose behalf the utilization management agent performs;
    determining, by the one or more computers comprising the bid management agent, whether the quote is acceptable;
    sending, by the one or more computers comprising the bid management agent, a contract to the utilization management agent if the quote is acceptable; and
    updating, by the one or more computers comprising the utilization management agent, a time frame corresponding to the project to indicate that the time frame is unavailable for scheduling other projects for the developer.

2. The method as recited in claim 1, wherein the quote is a first quote and the utilization management agent is a first utilization management agent and further comprising:
    receiving a second quote at the one or more computers comprising the bid management agent from one or more computers comprising a second utilization management agent;
    determining which of the first and second quotes to accept based on quote selection criteria specified by the project manager; and wherein
    sending a contract to the one or more computers comprising the utilization management agent if the quote is acceptable comprises sending the contract to the one or more computers comprising the one of the first and second utilization management agents corresponding to the accepted one of the first and second quotes.

3. The method as recited in claim 1, further comprising: notifying the developer of the contract formation.

4. A method for staffing a project, the method comprising:
    receiving project definitions from a project manager;
    broadcasting at least some of the project definitions to one or more computers comprising a plurality of utilization management agents, each of the plurality associated with one of a plurality of entities possessing skills and desiring projects on which to work;
    receiving, from the one or more computers comprising the plurality of utilization management agents, a plurality of quotes for performance if the entities associated with each of the plurality possess skills and desire projects corresponding to said project definitions;
    determining whether to accept one quote from the plurality of quotes;
    sending a contract to the one or more computers comprising the one of the plurality of utilization management agents corresponding to the accepted quote; and
    updating, by the one or more computers comprising the utilization management agent, a time frame corresponding to the project to indicate that the time frame is unavailable for scheduling other projects for the entity.

5. The method as recited in claim 4, wherein the project definitions specify at least one of skill set required, work product desired, time frame, duration of project, experience level desired of entities, educational level of persons within the entities, and compensation.

6. A method of acquiring work projects for an entity via a utilization management agent, the method comprising:
    receiving, at the one or more computers comprising the utilization management agent, a request for quote for a project wherein the request includes project details;
    responsive to a determination by the one or more computers comprising the utilization management agent that an entity's preferences and attributes conform with the project details and that the entity's availability correspond with duration and scheduling requirements of the project, sending a quote to one or more computers comprising a bid management agent corresponding with the request for quote.

7. The method as recited in claim 6, further comprising:
    receiving a contract from the one or more computers comprising the bid management agent; and validating acceptance of the contract.

8. The method as recited in claim 7, wherein validating acceptance of the contract comprises presenting the contract details to the entity.

9. The method as recited in claim 7, wherein validating acceptance of the contract comprises comparing the contract details with developer specified criteria to ensure correspondence.

10. A computer program product in a computer readable media for use in a data processing system for matching skill possessors with projects, the computer program product comprising:
    first instructions for receiving, at a bid management agent, project specifications;
    second instructions for broadcasting, by the bid management agent, at least some of the project specifications over a network;
    third instructions for receiving, at a utilization management agent, the at least some of the project specifications;
    fourth instructions for sending a quote to the bid management agent if the at least some of the project specifications match criteria specified by a developer on whose behalf the utilization management agent performs;
    fifth instructions for determining, by the bid management agent, whether the quote is acceptable;
    sixth instructions for sending a contract to the utilization management agent if the quote is acceptable; and
    seventh instructions for updating, by the utilization management agent, a time frame corresponding to the project to indicate that the time frame is unavailable for scheduling other projects for the developer.

11. The computer program product as recited in claim 10, wherein the quote is a first quote and the utilization management agent is a first utilization management agent and further comprising:
    seventh instructions for receiving a second quote at the bid management agent from a second utilization management agent;
    eighth instructions for determining which of the first and second quotes to accept based on quote selection criteria specified by the project manager; and wherein
    the sending a contract to the utilization management agent if the quote is acceptable comprises sending the contract to the one of the first and second utilization management agents corresponding to the accepted one of the first and second quotes.

12. The computer program product as recited in claim 10, further comprising:

seventh instructions for notifying the developer of the contract formation.

13. A computer program product in a computer readable media for use in a data processing system for staffing a project, the computer program product comprising:

first instructions for receiving project definitions from a project manager;

second instructions for broadcasting at least some of the project definitions to utilization management agents who work on behalf of entities possessing skills and desiring projects on which to work;

third instructions for receiving a plurality of quotes for performance from a plurality of utilization management agents if the entities associated with each of the plurality of quotes possess skills and desire projects corresponding to said project definitions;

fourth instructions for determining whether to accept one quote from the plurality of quotes;

fifth instructions for sending a contract to the one of the plurality of utilization management agents corresponding to the accepted quote; and sixth instructions for updating a time frame corresponding to the project to indicate that the time frame is unavailable for scheduling other projects for the entity.

14. The computer program product as recited in claim 13, wherein the project definitions specify at least one of skill set required, work product desired, time frame, duration of project, experience level desired of entities, educational level of persons within the entities, and compensation.

15. A computer program product in a computer readable media for use in a data processing system for acquiring work projects for an entity via a utilization management agent, the computer program product comprising:

first instructions for receiving, at the utilization management agent, a request for quote for a project wherein the request includes project details;

second instructions, responsive to a determination by the utilization management agent that an entity's preferences and attributes conform with the project details and that the entity's availability correspond with duration and scheduling requirements of the project, for sending a quote to a bid management agent corresponding with the request for quote.

16. The computer program product as recited in claim 15, further comprising:

third instructions for receiving a contract from the bid management agent; and fourth instructions for validating acceptance of the contract.

17. The computer program product as recited in claim 16, wherein validating acceptance of the contract comprises presenting the contract details to the entity.

18. The computer program product as recited in claim 16, wherein validating acceptance of the contract comprises comparing the contract details with developer specified criteria to ensure correspondence.

19. A system for matching skill possessors with projects, the system comprising:

first means for receiving, at a bid management agent, project specifications;

second means for broadcasting, by the bid management agent, at least some of the project specifications over a network;

third means for receiving, at a utilization management agent, the at least some of the project specifications;

fourth means for sending a quote to the bid management agent if the at least some of the project specifications match criteria specified by a developer on whose behalf the utilization management agent performs;

fifth means for determining, by the bid management agent, whether the quote is acceptable;

sixth means for sending a contract to the utilization management agent if the quote is acceptable; and seventh means for updating, by the utilization management agent, a time frame corresponding to the project to indicate that the time frame is unavailable for scheduling other projects for the developer.

20. The system as recited in claim 19, wherein the quote is a first quote and the utilization management agent is a first utilization management agent and further comprising:

seventh means for receiving a second quote at the bid management agent from a second utilization management agent;

eighth means for determining which of the first and second quotes to accept based on quote selection criteria specified by the project manager; and wherein the sending a contract to the utilization management agent if the quote is acceptable comprises sending the contract to the one of the first and second utilization management agents corresponding to the accepted one of the first and second quotes.

21. The system as recited in claim 19, further comprising: seventh means for notifying the developer of the contract formation.

22. A system for staffing a project, the system comprising:

first means for receiving project definitions from a project manager;

second means for broadcasting at least some of the project definitions to utilization management agents who work on behalf of entities possessing skills and desiring projects on which to work;

third means for receiving a plurality of quotes for performance from a plurality of utilization management agents if the entities associated with each of the plurality of quotes possess skills and desire projects corresponding to said project definitions;

fourth means for determining whether to accept one quote from the plurality of quotes;

fifth means for sending a contract to the one of the plurality of utilization management agents corresponding to the accepted quote; and sixth means for updating a time frame corresponding to the project to indicate that the time frame is unavailable for scheduling other projects for the entity.

23. The system as recited in claim 22, wherein the project definitions specify at least one of skill set required, work product desired, time frame, duration of project, experience level desired of entities, educational level of persons within the entities, and compensation.

24. A system for acquiring work projects for an entity via a utilization management agent, the system comprising:

first means for receiving, at the utilization management agent, a request for quote for a project wherein the request includes project details;

second means, responsive to a determination by the utilization management agent that an entity's preferences and attributes conform with the project details and that the entity's availability correspond with duration and scheduling requirements of the project, for sending a quote to a bid management agent corresponding with the request for quote.

25. The system as recited in claim 24, further comprising:
third means for receiving a contract from the bid management agent; and
fourth means for validating acceptance of the contract.

26. The system as recited in claim 25, wherein validating acceptance of the contract comprises presenting the contract details to the entity.

27. The system as recited in claim 25, wherein validating acceptance of the contract comprises comparing the contract details with developer specified criteria to ensure correspondence.

28. The method of claim 1 further comprising:
sending a quote to the one or more computers comprising the bid management agent only if the time frame indicates that the developer is available during a period corresponding to the project.

29. The computer program product of claim 10 wherein the fourth instructions for sending further comprise instructions for sending a quote to the one or more computers comprising the bid management agent only if the time frame indicates that the developer is available during a period corresponding to the project.

30. The system of claim 19 wherein the fourth means for sending further comprise means for sending a quote to the bid management agent only if the time frame indicates that the developer is available during a period corresponding to the project.

* * * * *